(12) United States Patent
Martin, III

(10) Patent No.: US 9,453,570 B2
(45) Date of Patent: Sep. 27, 2016

(54) DIFFERENTIAL LOCK WITH ASSISTED RETURN

(75) Inventor: Robert J. Martin, III, Newark, OH (US)

(73) Assignee: ArvinMeritor Technology, LLC, Troy, MI (US)

(*) Notice: Subject to any disclaimer, the term of this patent is extended or adjusted under 35 U.S.C. 154(b) by 781 days.

(21) Appl. No.: 12/631,984

(22) Filed: Dec. 7, 2009

(65) Prior Publication Data

US 2011/0136611 A1 Jun. 9, 2011

(51) Int. Cl.
| | |
|---|---|
| *F16H 48/30* | (2012.01) |
| *F16H 48/08* | (2006.01) |
| *F16H 48/24* | (2006.01) |
| *F16H 48/32* | (2012.01) |
| *F16H 48/42* | (2012.01) |

(52) U.S. Cl.
CPC .............. *F16H 48/30* (2013.01); *F16H 48/08* (2013.01); *F16H 48/24* (2013.01); *F16H 48/32* (2013.01); *F16H 2048/426* (2013.01); *F16H 2200/2071* (2013.01)

(58) Field of Classification Search
USPC ................ 475/231, 233, 235, 240, 249, 250
See application file for complete search history.

(56) References Cited

U.S. PATENT DOCUMENTS

| | | | |
|---|---|---|---|
| 2,803,149 A | 8/1957 | Pringle | |
| 2,997,897 A | 8/1961 | Brownyer | |
| 3,264,901 A | 8/1966 | Ferbitz et al. | |
| 3,534,633 A | 10/1970 | Chocholek | |
| 4,167,881 A | 9/1979 | Bell et al. | |
| 4,280,583 A * | 7/1981 | Stieg | 180/250 |
| 4,462,271 A * | 7/1984 | Stieg | 475/86 |
| 4,703,671 A * | 11/1987 | Jikihara | 475/86 |
| 6,200,241 B1 | 3/2001 | Pinotti et al. | |
| 6,283,884 B1 | 9/2001 | El-Kassouf | |
| 6,309,321 B1 * | 10/2001 | Valente | 475/249 |
| 6,508,734 B2 | 1/2003 | El-Kassouf | |
| 6,533,698 B1 | 3/2003 | Yamada | |
| 6,648,788 B1 | 11/2003 | Sullivan | |
| 6,765,965 B1 | 7/2004 | Hanami et al. | |
| 6,843,750 B1 | 1/2005 | Bennett | |
| 7,291,083 B2 | 11/2007 | Almaguer | |
| 2002/0198076 A1 * | 12/2002 | Bryson et al. | 475/231 |
| 2006/0154776 A1 * | 7/2006 | Claussen et al. | 475/231 |
| 2006/0247087 A1 | 11/2006 | Pontanari et al. | |
| 2007/0249459 A1 * | 10/2007 | Lubben et al. | 475/231 |
| 2008/0103010 A1 | 5/2008 | Pontanari et al. | |
| 2009/0176613 A1 | 7/2009 | Gianone | |

* cited by examiner

*Primary Examiner* — Justin Holmes
(74) *Attorney, Agent, or Firm* — Brooks Kushman P.C.

(57) ABSTRACT

A differential lock mechanism includes a shift member and a shift collar that is moveable by the shift member between an engaged position with a differential assembly and a disengaged position. A pneumatic control provides a first pneumatic signal to move the shift collar into the engaged position and provides a second pneumatic signal to return the shift collar to the disengaged position.

22 Claims, 5 Drawing Sheets

DIFFERENTIAL LOCK WITH ASSISTED RETURN

TECHNICAL FIELD

The subject invention relates to a differential lock for a carrier that uses a pneumatic signal to disengage the differential lock.

BACKGROUND OF THE INVENTION

Drive axles include an input gear set comprised of a pinion gear in meshing engagement with a ring gear. The ring gear is attached to a differential assembly that includes a differential case supporting a plurality of differential gears associated with a differential spider. The differential gears are in meshing engagement with a pair of side gears where each side gear drives one axle shaft. The axle shafts drive laterally spaced wheels. The pinion receives driving input from a vehicle power source and drives the ring gear, which is fixed to the differential case. The differential assembly drives the axle shafts via the side gears to rotate the wheels.

In certain configurations, the carrier is equipped with a driver controlled differential lock (DCDL). The DCDL is typically controlled by an air actuated shift assembly that is mounted on the carrier. The differential lock is movable between an engaged position and a disengaged position. When in the engaged position, a shift collar is moved into engagement with the differential case to lock the axle shafts and the differential assembly together. In this condition there is no differential action between the wheels of the drive axle. To disengage the DCDL, the shift collar is moved out of engagement with the differential case and there is normal differential action between the wheels of the axle.

The air actuated shift assembly generates an air signal to move the shift collar into engagement with the differential case. To disengage the DCDL, the air pressure is removed and a single return spring biases the collar away from the differential case. If the DCDL fails to disengage when differential action is required, the carrier can fail.

SUMMARY OF THE INVENTION

The subject invention provides a differential lock mechanism that includes a shift collar that is moveable between an engaged position with a differential assembly and a disengaged position. A first pneumatic signal is generated to move the shift collar to the engaged position and a second pneumatic signal is generated to return the shift collar to the disengaged position.

In one example, a resilient member biases the shift collar to the disengaged position. The second pneumatic signal cooperates with the resilient member to provide an increased return force.

In one example configuration, the shift collar is coupled for movement with a shift member, such as a shift fork for example, which is responsive to the first and second pneumatic signals.

In one example, the shift member is mounted for movement with a rod. The rod comprises a cylindrical body extending between first and second rod ends and includes an enlarged flange portion. The first pneumatic signal is exerted against the enlarged flange portion to move the shift collar into the engaged position. The cylindrical body includes an internal bore extending from the first rod end to the second rod end. The second pneumatic signal is communicated through the internal bore to return the shift collar to the disengaged position.

In one example, the rod is positioned within an internal cavity defined by a housing portion in a carrier shell. A cover portion encloses the interior cavity and includes at least one inlet to communicate pneumatic signals into the interior cavity.

In one example, the at least one inlet comprises a first inlet that directs the first pneumatic signal against the enlarged flange portion and a second inlet that directs the second pneumatic signal into the internal bore.

In one example, the at least one inlet comprises a single inlet that cooperates with at least one solenoid valve. The at least one solenoid valve is operable to direct the first pneumatic signal against the enlarged flange portion to move the shift collar to the engaged position and to direct the second pneumatic signal into the internal bore to return the shift collar to the disengaged position.

These and other features of the present invention can be best understood from the following specification and drawings, the following of which is a brief description.

DETAILED DESCRIPTION OF THE PREFERRED EMBODIMENT

Figure 1:
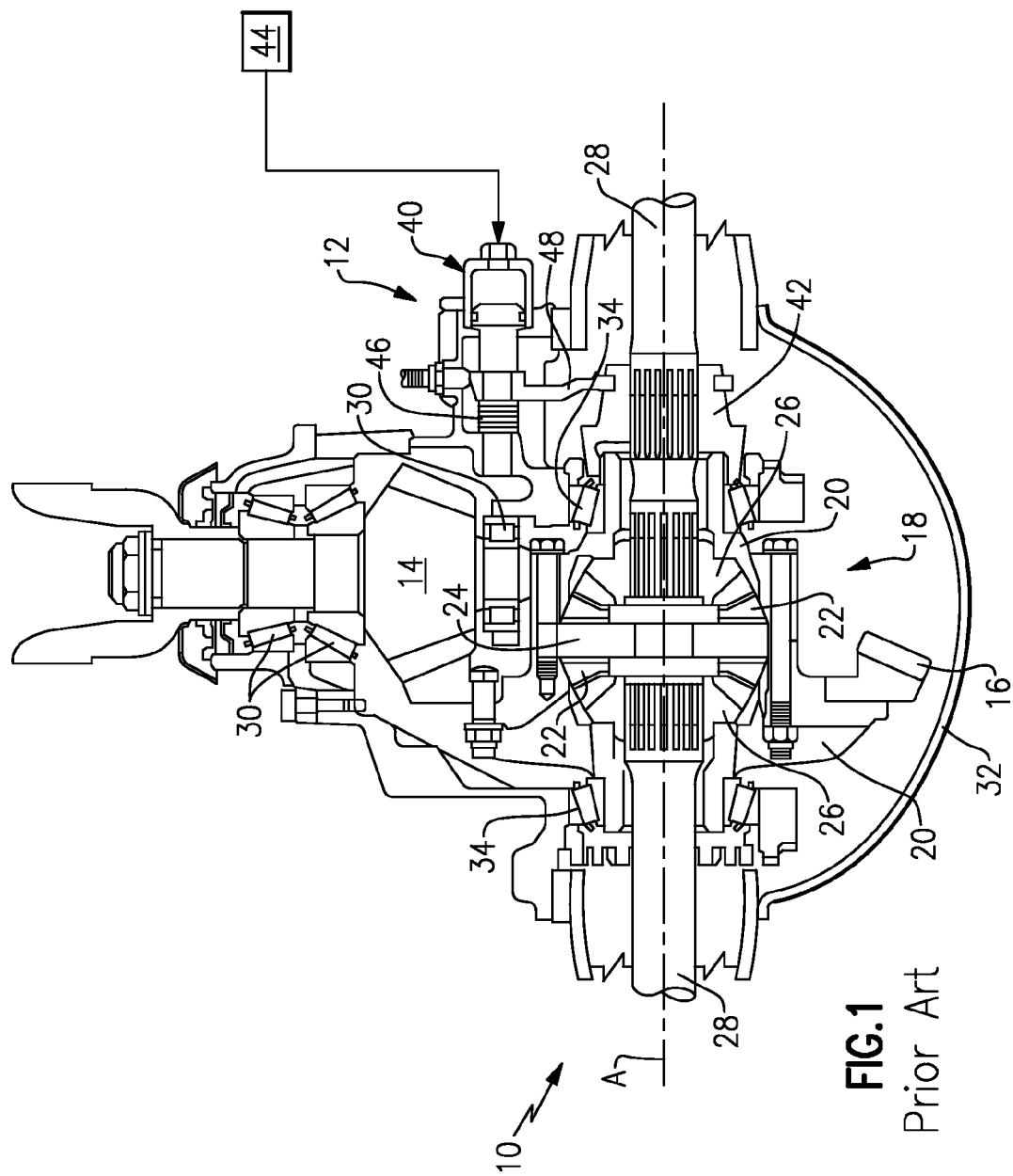
FIG. 1 is a section view of a prior art carrier including a differential lock mechanism.

FIG. 1 shows a prior art example of a carrier 10 with a differential lock mechanism 12. The carrier 10 is part of a drive axle and includes an input gear set comprised of a pinion gear 14 in meshing engagement with a ring gear 16. The ring gear 16 is attached to a differential assembly 18 that includes a differential case 20 supporting a plurality of differential gears 22 associated with a differential spider 24 as known. The differential gears 22 are in meshing engagement with a pair of side gears 26 with each side gear 26 driving one axle shaft 28. The axle shafts 28 drive laterally spaced wheels (not shown) about an axis of rotation A.

The pinion gear 14 is supported on bearings 30 and receives driving input from a vehicle power source, such as an engine or electric motor for example. The pinion gear 14 drives the ring gear 16 which is fixed to the differential case 20. The differential assembly 18 drives the axle shafts 28 via the side gears 26 to rotate the wheels. The differential case 20 is rotatably supported by differential bearings 34 which are installed between the differential case 20 and a carrier housing shell 32 of the carrier 10.

The carrier 10 includes the differential lock mechanism 12, which is controlled by a vehicle operator. In the example shown in FIG. 1, the differential lock mechanism 12 is controlled by an air actuated shift assembly 40 that is mounted on the carrier 10. The differential lock mechanism 12 is movable between an engaged position and a disengaged position. When in the engaged position, a shift collar 42 is moved into engagement with the differential case 20 by a shift fork 48 to lock the axle shafts and the differential assembly 18 together. In this condition there is no differential action between the wheels of the drive axle. To disengage the DCDL, the shift collar 42 is moved out of engagement with the differential case 20 and there is normal differential action between the wheels of the drive axle.

The air actuated shift assembly 40 is in communication with an air supply 44 that generates an air signal to move the shift collar 42 into engagement with the differential case 20. To disengage the differential lock mechanism 12, the air pressure is removed and a single return spring 46 biases the shift collar 42 away from the differential case 20.

One disadvantage with this traditional configuration is that the shift collar 42 can become stuck in the engaged position. If the shift collar 42 is not disengaged when differential action is needed, the carrier 10 can fail.

Figure 2:
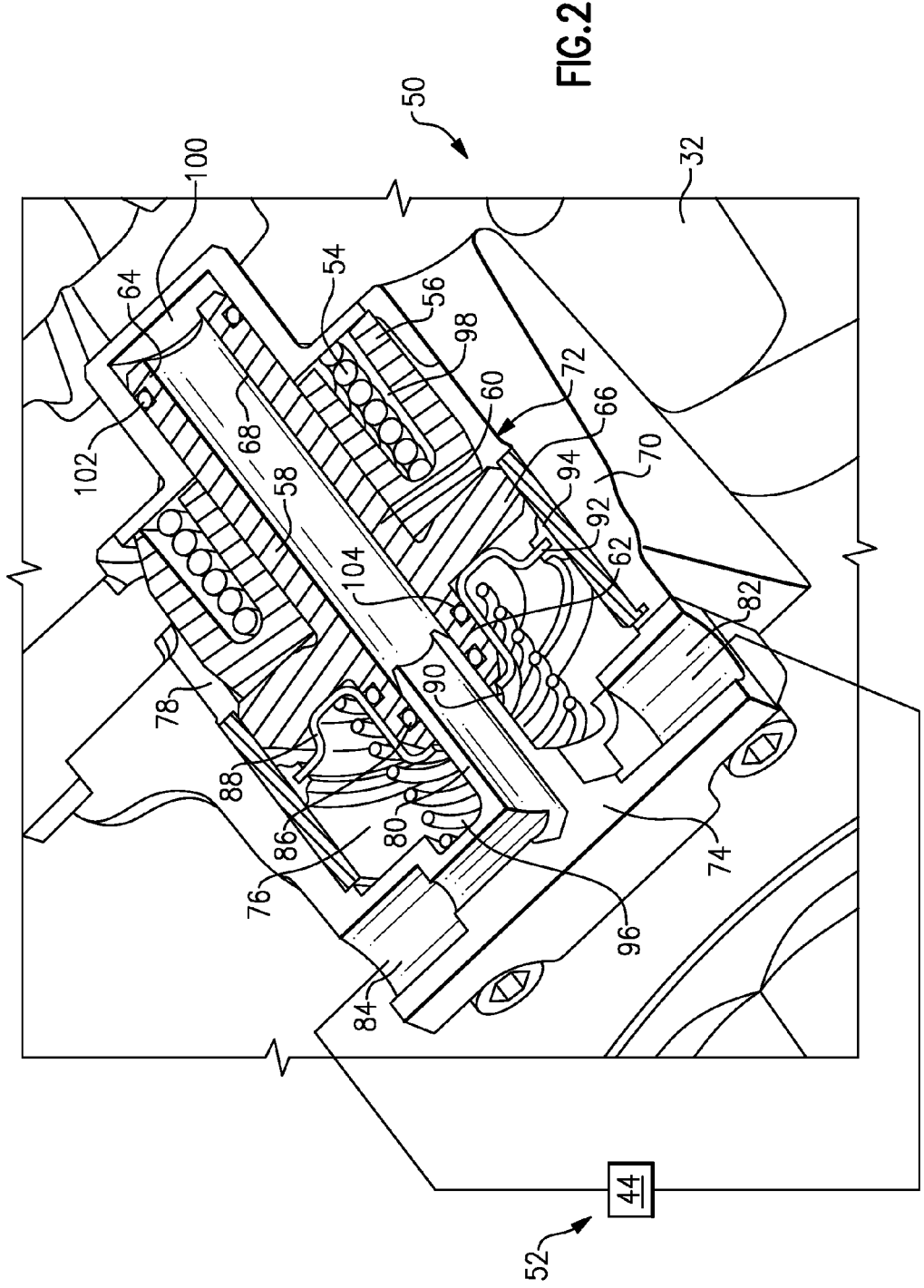
FIG. 2 is cross-sectional view of one example of a differential lock mechanism incorporating the invention in an engaged position.
Figure 3:
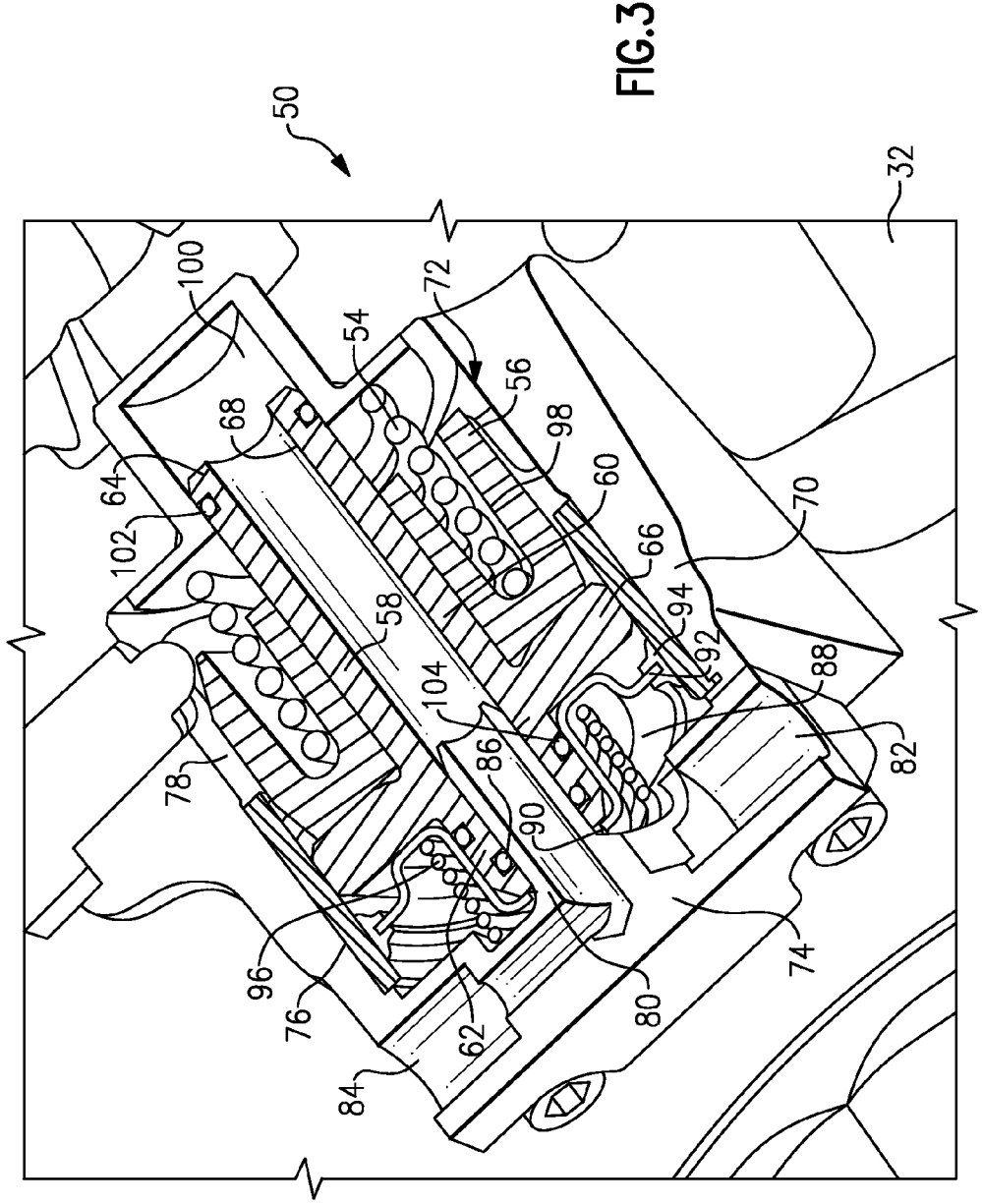
FIG. 3 shows the configuration of FIG. 2 in the disengaged position.

As shown in FIGS. 2-3, the subject invention comprises differential lock mechanism 50 for a carrier 10, such as that described in FIG. 1, and which includes a pneumatic control 52. The pneumatic control 52 generates a first pneumatic signal to move the shift collar 42 (FIG. 1) into the engaged position and generates a second pneumatic signal to return the shift collar 42 to the disengaged position in cooperation with a single resilient member 54. Optionally, the resilient member 54 can be removed and shift collar 42 can be returned to the disengaged position solely with the second pneumatic signal.

The differential lock mechanism 50 includes a shift member 56 that is coupled to the shift collar 42 such that movement of the shift member 56 results in movement of the shift collar 42. The resilient member 54 is configured to bias the shift member 56 to the disengaged position. In one example, the shift member 56 comprises a shift fork and the resilient member 54 comprises a single coil spring.

The shift member 56 is mounted for movement with a rod 58 that is moveable in response to the first and the second pneumatic signals. The rod 58 comprises a cylindrical body 60 extending between first 62 and second 64 rod ends. An outer peripheral surface of the cylindrical body 60 is defined by a first diameter, which is generally constant along a length of the rod 58. The rod 58 includes an enlarged flange portion 66 that is formed about the cylindrical body 60. The enlarged flange portion 66 is defined by a second diameter that is greater than the first diameter. In the example shown, the enlarged flange portion 66 is formed to be adjacent to the first rod end 62; however, the enlarged flange portion 66 could be positioned at other locations along the rod 58. The first pneumatic signal is exerted against the enlarged flange portion 66 to move the shift collar 42 into the engaged position via the shift member 56.

The cylindrical body 60 includes an internal bore 68 extending from the first rod end 62 to the second rod end 64. The second pneumatic signal is communicated through the internal bore 68 to return the shift collar 42 to the disengaged position.

The carrier 10 includes housing portion 70 in the carrier housing shell 32 that defines an interior cavity 72. A cover portion 74 encloses the interior cavity 72 and is attached to the housing portion 70. In the example shown, fasteners are used to secure the cover portion 74 in place; however, other attachment methods/structures could also be used. The rod 58 is positioned within the interior cavity 72 such that the enlarged flange portion 66 separates the interior cavity 72 into first 76 and second 78 chambers. The cover portion 74 includes at least one inlet to communicate the first pneumatic signal into the first chamber 76 to move the shift collar 42 to the engaged position. The cover portion 74 also includes a stem 80 that is received within the internal bore 68 of the rod 58 to direct the second pneumatic signal into the internal bore 68. The stem 80 is self-centering in the bore 68 during assembly to minimize the addition of binding forces. The stem 80 can be integrally formed with the cover portion 74 or can be a separately installed tube.

In the example shown in FIGS. 2-3, the at least one inlet comprises a first inlet 82 that directs the first pneumatic signal into the first chamber 76 and a second inlet 84 that directs the second pneumatic signal into the internal bore 68. The second inlet 84 is in fluid communication with the stem 80 which is assembled into the internal bore 68. A seal 86 provides a sealed interface between the stem 80 and an inner surface that defines the internal bore 68. In the example shown, the first 82 and second 84 inlets are positioned on opposing end faces of the cover portion 74; however, they could also be located at other positions depending upon packaging requirements.

A large flexible seal 88 is positioned within the first chamber 76 and is mounted for movement with the rod 58. The seal 88 includes a center bore 90 through which the stem 80 extends. An outer peripheral edge 92 of the seal 88 is received within a slide mount 94 that slides along an inner wall of the first chamber 76 as the rod 58 moves back and forth between engaged and disengaged positions. A seal 104 also provides a sealed interface between an inner surface of the seal 88 and an outer surface of the first rod end 62.

A resilient member 96 is positioned within the first chamber and reacts between the enlarged flange portion 66 and an end wall of the first chamber 76. The seal 88 is located between one end of the resilient member 96 and the enlarged flange portion 66. Further, a portion of the resilient member 96 surrounds a portion of the seal 88 and the associated first rod end 62. In one example, the resilient member 96 comprises a single coil spring. The resilient member 96 biases the rod 58 toward the engaged position.

The return biasing force of the resilient member 54, which is located in the second chamber 78 and associated with the shift member 56, is greater than the biasing force of the resilient member 96 in the first chamber 76. The resilient member 96 cooperates with the first pneumatic signal to overcome the biasing force of resilient member 54 to move the shift collar 42 to the engaged position.

In the example shown, the shift member 56 includes an annular recess 98 that receives the resilient member 54. One end of the resilient member 54 reacts against the shift member 56 and an opposite end reacts against an end wall of the second chamber 78.

An additional chamber 100 extends from the second chamber 78. The second rod end 64 extends into the additional chamber 100, which is defined by a smaller cross-sectional area than that of the second chamber 78. A seal 102 provides a sealing interface between the second rod end 64 and an inner wall of the additional chamber 100. The second pneumatic signal reacts against an end wall of the additional chamber 100 to assist the resilient member 54 in returning the shift collar 42 to the disengaged position.

Figure 4:
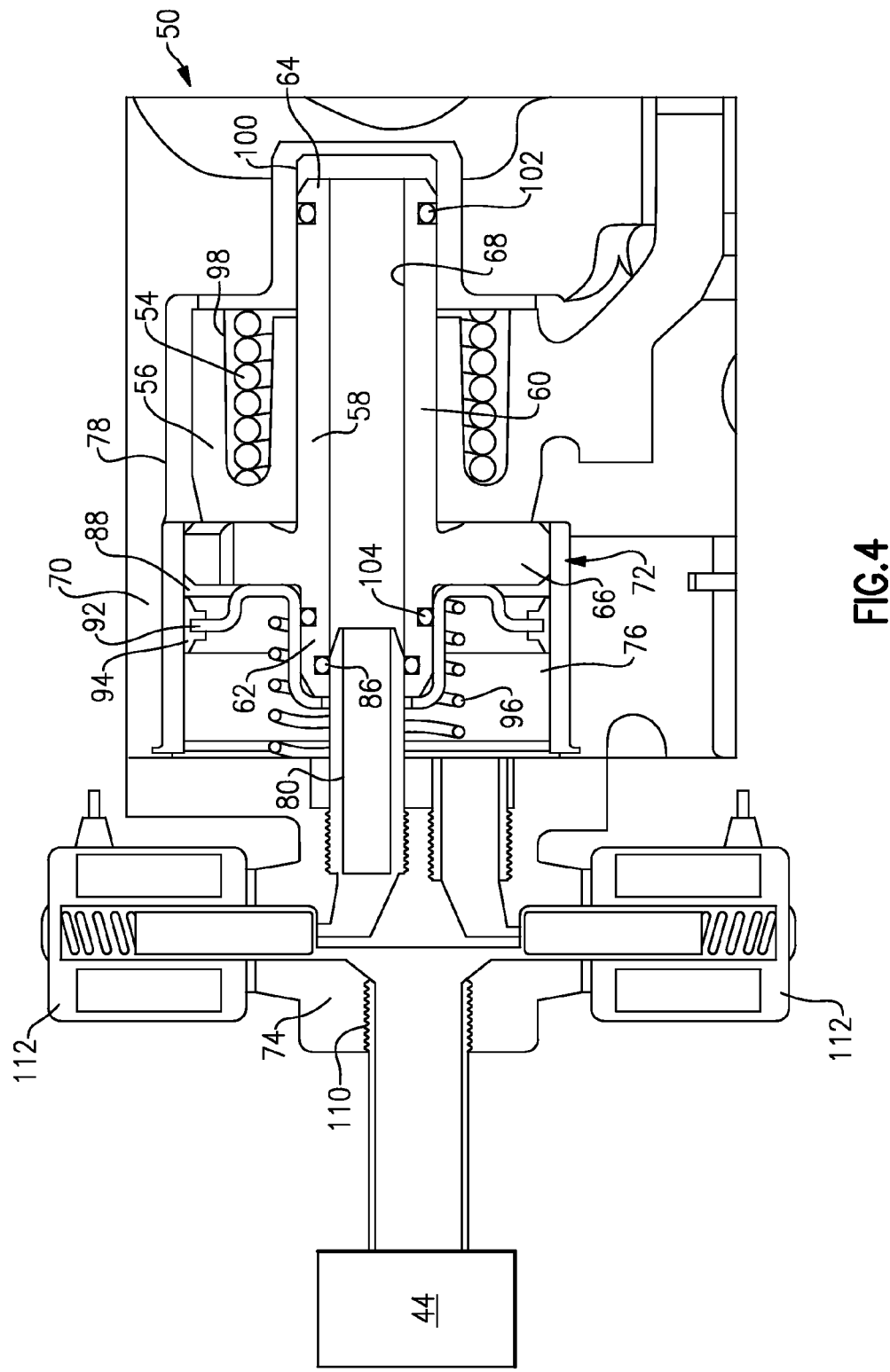
FIG. 4 shows a schematic view of another example of a differential lock mechanism incorporating the invention.

The example shown in FIG. 4 is similar to that of FIGS. 2-3 except that instead of having two air inlets, the cover portion 74 includes a single inlet 110, which simplifies the pneumatic connections. Dual two-way solenoid valves 112 operate to direct airflow to allow engagement or disengagement of the shift collar 42 as needed. When the vehicle operator engages the differential lock mechanism 50, one solenoid valve 112 blocks flow access to the internal bore 68 by preventing airflow into the stem 80 while the other valve 112 allows the first pneumatic signal to be communicated from the inlet 110 into the first chamber 76. When the differential lock mechanism 50 is disengaged by the vehicle operator, one solenoid valve 112 blocks airflow to the first chamber 76 and the other valve 112 allows the second pneumatic signal to enter the internal bore 68.

Figure 5:
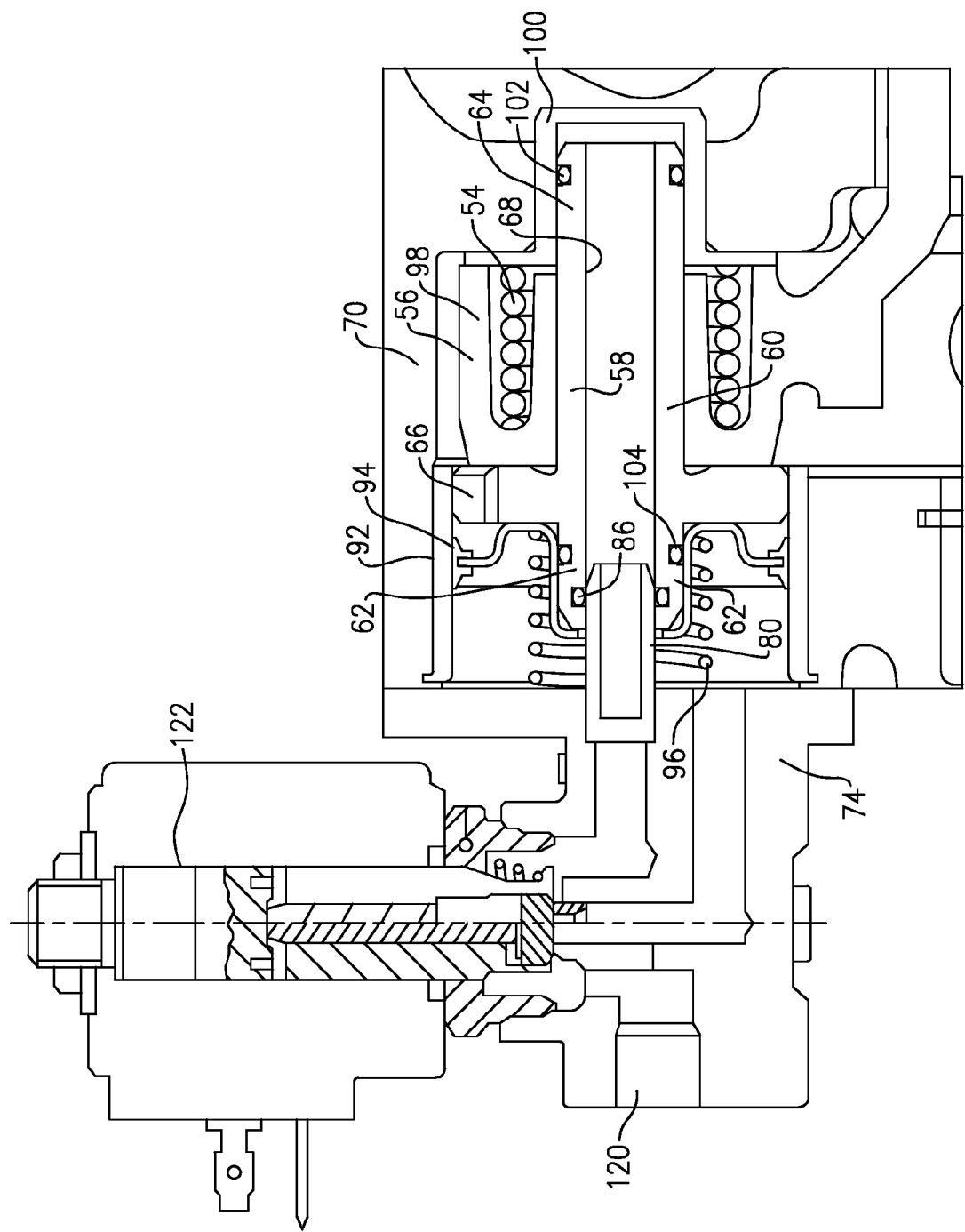
FIG. 5 shows a schematic view of another example of a differential lock mechanism incorporating the invention.

Another example shown in FIG. 5 also includes a single inlet 120. In this example, a single two-way solenoid valve 122 is used to communicate airflow either to the internal bore 68 or to the first chamber 76. To engage the differential lock mechanism 50, the solenoid valve 122 opens to block airflow to the stem 80 and allow airflow into the first chamber. To disengage the differential lock mechanism 50, the solenoid valve 122 is closed to block airflow to the first chamber 76 and allow airflow into the stem 80.

By using a pneumatic control to aid the resilient member in disengagement, the separating force can be doubled compared to prior configurations. In one prior example, a spring provided a return force of approximately 35 pounds. Vehicle air system requirements are usually within the range of 90-120 psi. By adjusting the size of the internal bore in the rod, an additional return pressure can be provided up to an additional 40 pounds. Thus, by using a resilient member in combination with an air assisted return a total of 65-75 pounds of disengagement force can be provided.

It should also be understood that while the differential lock mechanism 50 is discussed above in association with a single drive axle, the differential lock mechanism 50 could be used with carriers for any type of drive axle.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A differential lock mechanism comprising:
a shift member mounted for movement with a rod;
a shift collar moveable by said shift member between an engaged position with a differential assembly and a disengaged position;
a pneumatic control providing a first pneumatic signal to move said shift collar into said engaged position and providing a second pneumatic signal to return said shift collar to said disengaged position in cooperation with a resilient member, wherein said rod is moveable in response to said first and said second pneumatic signals, wherein said rod comprises a cylindrical body extending between first and second rod ends, wherein said rod includes an enlarged flange portion formed about said cylindrical body, wherein said first pneumatic signal is exerted against said enlarged flange portion to move said shift collar into said engaged position, wherein said cylindrical body includes an internal bore extending from said first rod end to said second rod end, and wherein said second pneumatic signal is communicated through said internal bore to return said shift collar to said disengaged position.

2. The differential lock mechanism according to claim 1 wherein said shift member comprises a shift fork.

3. The differential lock mechanism according to claim 1 wherein said resilient member is biased to return said shift collar to said disengaged position in cooperation with said second pneumatic signal.

4. The differential lock mechanism according to claim 1 including a housing portion in a carrier shell defining an interior cavity and a cover portion enclosing said interior cavity, wherein said rod is positioned within said interior cavity such that said enlarged flange portion separates said interior cavity into first and second chambers, and wherein said cover portion includes at least one inlet to communicate said first pneumatic signal into said first chamber to move said shift collar to the engaged position.

5. The differential lock mechanism according to claim 4 including at least one seal positioned within said first chamber and mounted for movement with said rod.

6. The differential lock mechanism according to claim 4 including an additional chamber extending from said second chamber wherein said shift member is positioned within said second chamber with said second rod end extending into said additional chamber.

7. The differential lock mechanism according to claim 6 wherein said additional chamber is defined by a smaller cross-sectional area than said second chamber.

8. The differential lock mechanism according to claim 6 wherein said resilient member is biased to return said shift collar to said disengaged position, and wherein said second pneumatic signal reacts against an end wall of said additional chamber to assist said resilient member in returning said shift collar to said disengaged position.

9. The differential lock mechanism according to claim 8 wherein said resilient member reacts between said shift member and an end wall of said second chamber to assist in returning said shift collar to said disengaged position.

10. The differential lock mechanism according to claim 6 including at least one seal between said second rod end and an inner surface of said additional chamber.

11. The differential lock mechanism according to claim 5 wherein said resilient member is biased to return said shift collar to said disengaged position in cooperation with said second pneumatic signal, and including an additional resilient member positioned within said first chamber and reacting between said at least one seal and said cover portion, said additional resilient member cooperating with said first pneumatic signal to move said shift collar to said engaged position.

12. The differential lock mechanism according to claim 4 wherein said at least one inlet comprises a single inlet and including at least one solenoid valve that is operable to direct said first pneumatic signal into said first chamber to move said shift collar to said engaged position and to direct said second pneumatic signal into said internal bore to return said shift collar to said disengaged position.

13. The differential lock mechanism according to claim 4 wherein said at least one inlet comprises a first inlet that directs said first pneumatic signal into said first chamber and a second inlet that directs said second pneumatic signal into said internal bore.

14. A method of operating a differential lock mechanism comprising the steps of:
(a) providing a shift collar that is moveable between an engaged position with a differential assembly and a disengaged position, the differential assembly providing driving output to first and second axle shafts;
(b) generating a first pneumatic signal in response to a differential lock request to move said shift collar to said engaged position, wherein when in said engaged position the differential assembly and first and second axle shafts are locked for rotation together;
(c) generating a second pneumatic signal in response to a differential unlock request to return said shift collar to said disengaged position in cooperation with a resilient member, with the resilient member and second pneumatic signal cooperating to separate the differential assembly and the shift collar from contact with each other to allow the axle shafts to rotate at different speeds; and (d) moving the collar via a shift member that is mounted for movement with a rod, and wherein the rod comprises a cylindrical body extending between first and second rod ends, an enlarged flange portion formed about the cylindrical body, and internal bore formed within the cylindrical body to extend from the first rod end to the second rod end, and including the steps of exerting the first pneumatic signal against the enlarged flange portion to move the shift collar into the engaged position; and communicating the second pneumatic signal through the internal bore to return the shift collar to the disengaged position.

15. The method according to claim 14 including biasing the shift collar to the disengaged position with the resilient member and wherein during step (c) a resilient return force from the resilient member cooperates with the second pneumatic signal to return the shift collar to the disengaged position.

16. The method according to claim 14 including providing a housing portion in a carrier shell defining an interior cavity and a cover portion enclosing the interior cavity, and including the steps of separating the interior cavity into first and second chambers with the enlarged flange portion, forming at least one inlet in the cover portion to communicate the first pneumatic signal into the first chamber to move the shift collar to the engaged position, and installing a seal within the first chamber for movement with the rod.

17. The method according to claim 16 including providing an additional resilient member positioned within the first chamber and reacting between the seal and the cover portion, and with the additional resilient member cooperating with the first pneumatic signal to move the shift collar to said engaged position.

18. The method according to claim 16 including forming a stem on the cover portion in communication with the inlet and positioning a distal end of the stem within the internal bore of the cylindrical body.

19. A differential lock mechanism comprising:
a shift member;
a shift collar moveable by said shift member between an engaged position with a differential assembly and a disengaged position; and
a pneumatic control providing a first pneumatic signal to move said shift collar into said first engaged position and providing a second pneumatic signal to return said shift collar to said disengaged position in cooperation with a resilient member;
wherein the differential assembly is configured to provide driving output to first and second axle shafts, and wherein said first pneumatic signal is generated in response to a differential lock request with said first and second axle shafts locked for rotation together with the differential assembly when in the engaged position, and wherein said second pneumatic signal is generated in response to a differential unlock request with said resilient member and said second pneumatic signal cooperating to separate said differential assembly and said shift collar from contact with each other to allow the axle shafts to rotate at different speeds when in the disengaged position.

20. The differential lock mechanism according to claim 19 including a housing portion in a carrier shell defining an interior cavity and a cover portion enclosing said interior cavity, and wherein said shift member is mounted for movement with a rod that includes a cylindrical body extending between first and second rod ends and an enlarged flange portion formed about the cylindrical body that separates said interior cavity into first and second chambers, and wherein cylindrical body includes an internal bore extending from said first rod end to said second rod end, wherein said first pneumatic signal is exerted against said enlarged flange portion to move said shift collar into said engaged position, and wherein said second pneumatic signal is communicated through said internal bore to return said shift collar to said disengaged position.

21. The differential lock mechanism according to claim 20 wherein said cylindrical body extends through a bore formed within said shift member, and wherein said resilient member is mounted within an annular recess formed within said shift member that is positioned radially outwardly of said bore.

22. The differential lock mechanism according to claim 20 wherein said cover portion includes a stem that extends into said internal bore.

* * * * *